US012744242B2

(12) United States Patent
Poudeh et al.

(10) Patent No.: US 12,744,242 B2
(45) Date of Patent: Sep. 22, 2026

(54) POLYMER-BASED ELECTROLYTE AND A METHOD FOR OBTAINING THE SAME

(71) Applicant: SABANCI UNIVERSITESI, Istanbul (TR)

(72) Inventors: Leila Haghighi Poudeh, Istanbul (TR); Mehmet Yildiz, Istanbul (TR); Yusuf Ziya Menceloglu, Istanbul (TR); Bekir Dizman, Istanbul (TR); Serkan Unal, Istanbul (TR)

(73) Assignee: SABANCI UNIVERSITESI, Istanbul (TR)

( * ) Notice: Subject to any disclaimer, the term of this patent is extended or adjusted under 35 U.S.C. 154(b) by 917 days.

(21) Appl. No.: 18/017,096

(22) PCT Filed: Jul. 27, 2020

(86) PCT No.: PCT/TR2020/050662

§ 371 (c)(1),
(2) Date: Jan. 20, 2023

(87) PCT Pub. No.: WO2022/025832

PCT Pub. Date: Feb. 3, 2022

(65) Prior Publication Data

US 2024/0014441 A1 Jan. 11, 2024

(51) Int. Cl.

*H01M 10/0565* (2010.01)
*H01G 11/62* (2013.01)
*H01M 10/0525* (2010.01)

(52) U.S. Cl.

CPC ........ *H01M 10/0565* (2013.01); *H01G 11/62* (2013.01); *H01M 10/0525* (2013.01); *H01M 2300/0082* (2013.01)

(58) Field of Classification Search

CPC ..... H01M 10/0565; H01M 2300/0082; H01M 10/054; H01G 11/62; C08G 73/0233
USPC .......................................................... 429/314
See application file for complete search history.

(56) References Cited

U.S. PATENT DOCUMENTS

2001/0023041 A1* 9/2001 Hayase .................. H01M 6/22 429/189
2002/0160271 A1* 10/2002 Frech ................ B01D 67/0088 429/317
2005/0238825 A1 10/2005 Hood et al.

FOREIGN PATENT DOCUMENTS

WO 02054515 A2 7/2002

OTHER PUBLICATIONS

Natasha Shirshova, et al., Structural supercapacitor electrolytes based on bicontinuous ionic liquid-epoxy resin systems, Journal of Materials Chemistry A, 2013, pp. 15300-15309, vol. 1.

(Continued)

*Primary Examiner* — Osei K Amponsah
*Assistant Examiner* — Kevin Nguyen
(74) *Attorney, Agent, or Firm* — Bayramoglu Law Offices LLC

(57) ABSTRACT

A polyoxazoline-based electrolyte and a network formed by crosslinking of the electrolyte through its secondary amine groups with an epoxy resin are provided. The network is designed as a multifunctional energy storage system that is capable of transferring mobile lithium cations through the passageways present in its structure. The present invention also relates to a method that is used to obtain such a network and electrolyte.

17 Claims, 5 Drawing Sheets

(56) References Cited

OTHER PUBLICATIONS

Hye Kyeong Jang, et al., Ion Conduction and Viscoelastic Response of Epoxy-Based Solid Polymer Electrolytes Containing Solvating Plastic Crystal Plasticizer, Macromolecular Chemistry and Physics, 2018, pp. 1-12, 1700514.

Febri Baskoro, et al., Strategic Structural Design of a Gel Polymer Electrolyte toward a High Efficiency Lithium-Ion Battery, ACS Applied Energy Materials, 2019, pp. 3937-3971, vol. 2.

Natasha Shirshova, et al., Composition as a Means To Control Morphology and Properties of Epoxy Based Dual-Phase Structural Electrolytes, The Journal of Physical Chemistry C, 2014, pp. 28377-28387, vol. 118.

Qihang Feng, et al., The ionic conductivity, mechanical performance and morphology of two-phase structural electrolytes based on polyethylene glycol, epoxy resin and nano-silica, Materials Science and Engineering B, 2017, pp.37-44, vol. 219.

Andrew S. Westover, et al., Multifunctional high strength and high energy epoxy composite structural supercapacitors with wet-dry operational stability, Journal of Materials Chemistry A, 2015.

Suk Jin Kwon, et al., Multifunctional Epoxy-Based Solid Polymer Electrolytes for Solid-State Supercapacitors, ACS Applied Materials Interfaces, 2018, pp. 1-35.

Jianying Ji, et al., Simultaneously enhancing ionic conductivity and mechanical properties of solid polymer electrolytes via a copolymer multi-functional filler, Electrochimica Acta, 2010, pp. 9075-9082, vol. 55.

James F. Snyder, et al., Improving multifunctional behavior in structural electrolytes through copolymerization of structure- and conductivity-promoting monomers, Polymer, 2009, pp. 4906-4916, vol. 50.

Kozo Matsumoto, et al., Synthesis of Ion Conductive Networked Polymers Based on an Ionic Liquid Epoxide Having a Quaternary Ammonium Salt Structure, Macromolecules, 2009, pp. 4580-4584, vol. 42, No. 13.

Kozo Matsumoto, et al., Confinement of Ionic Liquid by Networked Polymers Based on Multifunctional Epoxy Resins, Macromolecules, 2008, pp. 6981-6986, vol. 41, No. 19.

Kozo Matsumoto, et al., Synthesis of Networked Polymers by Copolymerization of Monoepoxy-Substituted Lithium Sulfonylimide and Diepoxy-Substituted Poly(ethylene glycol), and Their Properties, Journal of Polymer Science Part A: Polymer Chemistry, 2011, pp. 1874-1880, vol. 49.

Yalin Yu, et al., Co-continuous structural electrolytes based on ionic liquid, epoxy resin and organoclay: Effects of organoclay content, Materials and Design, 2016, pp. 126-133, vol. 104.

Tacey X. Viegas, et al., Polyoxazoline: Chemistry, Properties, and Applications in Drug Delivery, Bioconjugate Chemistry, 2011, pp. 976-986, vol. 22.

Maarten A. Mees, et al., Full and partial hydrolysis of poly(2-oxazoline)s and subsequent post-polymerization modification of the resulting polyethylenimine (co)polymers, Polymer Chemistry, 2018, pp. 1-11.

* cited by examiner

POLYMER-BASED ELECTROLYTE AND A METHOD FOR OBTAINING THE SAME

CROSS REFERENCE TO THE RELATED APPLICATION

This application is the national phase entry of International Application No. PCT/TR2020/050662, filed on Jul. 27, 2020, the entire contents of which are incorporated herein by reference.

TECHNICAL FIELD

The present invention relates to a polymer-based electrolyte and a network formed by crosslinking of this electrolyte through its amine groups. The network is designed as a multifunctional energy storage system that is capable of transferring mobile cations through the passageways present in its structure. The present invention also relates to a method for obtaining such network and electrolyte.

BACKGROUND

The invention of new energy storage materials has contributed significantly to the advancement of technologies used for applications such as aviation, portable electronic products and electric vehicles. Performance improvements of energy storage systems have been made over the years at the expense of increasing the weight of structural components. The emergence of multifunctional energy storage materials has provided a massive and significant opportunity for the manufacturing of low weight and high performance structures. “Multifunctional energy storage materials” refer to materials offering energy storage and load-bearing properties simultaneously, thereby achieving weight reductions in weight-sensitive energy storage applications. The successful commercialization of multifunctional energy storage devices has not been achieved yet mainly due to the trade-off relationship between energy storage capabilities and mechanical properties such as load-bearing and structural integrity. The technology readiness levels (TRLs) of multifunctional energy storage devices are at TRL 4 to TRL 5. Most research groups in the relevant technical field have focused on the development of different types of electrode materials and the improvement of specific capacitance and surface area values to overcome this trade-off problem. Although improvements have been observed in this respect, the poor performance of devices underlines the urgent need to improve performances of other components such as electrolyte, separator and their interface. The most pressing need in applications concerning energy storage materials is the enhancement of power density, which is directly related to the improvement of ionic conductivity of the employed electrolyte. In structural applications where mostly epoxy systems are used, the design of a multifunctional resin that functions as both an electrolyte and a high performance matrix is difficult due to the trade-off between mechanical performance and ionic conductivity. The former requires an acceptable degree of mechanical stiffness of polymer chain segments and an undamaged microstructure, while the latter requires soft chain segments and interconnected passageways throughout the epoxy network. The two most commonly used epoxy resins for the production of multifunctional electrolytes are poly (ethylene glycol) diglycidyl ether (PEGDGE) and diglycidyl ether of bisphenol-A (DGEBA). In solvent-free polymer electrolytes, long-range ion conduction is enabled by local polymer motion. A polymer matrix with a low degree of stiffness (robustness) typically provides a higher conductivity. Incorporation of an ionic liquid (IL) to the matrix along with the addition of some amount of lithium salts has been found to be an effective way to facilitate ion transportation (Shirshova et al., J. Mater. Chem. A. 1 (2013) 15300-15309, DOI:10.1039/c3ta13163g; Jang et al., Macromol. Chem. Phys. 219 (2018), DOI: 10.1002/macp.201700514; Baskoro and Yen, ACS Appl. Energy Mater. 2 (2019) 3937-3971, DOI:10.1021/acsaem.9b00295). ILs are widely used in polymer-based electrolytes because of their unique properties such as excellent thermal and chemical stability, low vapor pressure, nonflammability, low melting temperature and high ionic conductivity.

As described by Shirshova et al. (J. Mater. Chem. A. 1 (2013) 15300-15309, DOI:10.1039/c3ta13163g), the presence of ILs as molten salts in an epoxy network forms a bicontinuous phase, which facilitates ion transfer. However, the matrix becomes soft and cannot provide sufficient structural properties (i.e. mechanical performance) as a result of the increase in the amount of IL. In this regard, IL and epoxy form a heterogeneous microstructure that suffers from insufficient ion transport due to the lack of interconnected network (Shirshova et al. J. Phys. Chem. C. 118 (2014) 28377-28387. doi:10.1021/jp507952b).

Another approach to provide the ionic conductivity and load-bearing simultaneously is the copolymerization of certain kinds of non-structural monomers with structural ones (Feng et al., Mater. Sci. Eng. B Solid-State Mater. Adv. Technol. 219 (2017) 37-44. doi:10.1016/j.mseb.2017.03.001; DOI:10.1016/j.mseb.2017.03.001). Among various non-structural polymer electrolytes, polyethylene oxide (PEO) has been considered as the most promising polymeric electrolyte due to the suitable distance between etheric oxygen groups (Westover et al., J. Mater. Chem. A. 3 (2015) 20097-20102. DOI:10.1039/c5ta05922d). Since the movement of ions in the amorphous regions of polymers is easier, some research studies have focused on reducing the crystallinity of PEO-based electrolytes by crosslinking, copolymerization, and adding an inorganic filler (Kwon et al., ACS Appl. Mater. Interfaces. 10 (2018) 35108-35117, DOI:10.1021/acsami.8b11016; Ji et al., Electrochim. Acta. 55 (2010) 9075-9082, DOI:10.1016/j.electacta.2010.08.036). However, it should be mentioned that crosslinking leads to the binding of both ends of the PEO chains, thereby significantly reducing the mobility of PEO (Snyder et al., Polymer. 50(20), 4906-4916). Multifunctionality plots are effective in interpreting the trade-off between ionic conductivity and Young’s modulus of structural electrolytes. The goal is to achieve ionic conductivity and Young’s modulus values higher than 0.1 mS/cm and 200 MPa, respectively, which are considered as the threshold values. A reasonable goal for a structural electrolyte is to achieve both mechanical stiffness and ion conductivity within one order of magnitude of conventional materials. FIG. 1 shows the extent of multifunctionalities achieved in several publications. (Shirshova et al., J. Mater. Chem. A. 1 (2013) 15300-15309, DOI:10.1039/c3ta13163g; Shirshova et al., J. Phys. Chem. C. 118 (2014) 28377-28387, DOI: 10.1021/jp507952b; Ji et al., Electrochim. Acta. 55 (2010) 9075-9082, DOI:10.1016/j.electacta.2010.08.036; Matsumoto and Endo, Macromolecules. 42 (2009) 4580-4584, DOI:10.1021/ma900508q; Matsumoto and Endo, Macromolecules. 41 (2008) 6981-6986, DOI:10.1021/ma801293j; Matsumoto and Endo, J. Polym. Sci. Part A Polym. Chem. 49 (2011) 1874-1880, DOI:10.1002/pola.24614; Yu, Y., Zhang, B., Wang, Y., Qi, G., Tian, F., Yang, J., Wang, S.

2016. "Co-continuous structural electrolytes based on ionic liquid, epoxy resin and organoclay: Effects of organoclay content", Materials and Design, 104, 126-133, DOI: 10.1016/j.matdes.2016.05.004). Despite numerous attempts in this area as depicted in FIG. 1, structural electrolytes are still far from reaching the desired multifunctionality. Therefore, developing new materials and architectures is key to improving the multifunctionality of structural electrolytes.

SUMMARY

The primary object of the present invention is to overcome the shortcomings in the prior art.

Another object of the present invention is to provide a polymer-based electrolyte with increased multifunctionality degree.

A further object of the present invention is to obtain a network using this polymer-based electrolyte.

An even further object of the present invention is to propose a low-cost method which enables the generation or constitution of such a network and polymer-based electrolyte.

The present invention proposes a network which comprises a polyoxazoline (POZ) backbone cross-linked through amine groups thereof. The network formed by employing the polymer-based electrolyte according to the present invention enables a high extent of multifunctionality. The present invention further proposes a method to obtain such a network and polymer-based electrolyte.

BRIEF DESCRIPTION OF THE DRAWINGS

The figures, briefly explained here, are intended solely to provide a better understanding of the present invention and not to define the scope of protection or the context in which said scope is to be interpreted in the absence of the description.

"◇": PEO 100; "◆": copolymer of PEO:PEO-b-PE 50:50; "◀": epoxy-PEO/IL 60:40; "●": PEGDGE/IL 60:40; "▼": BADGE/Tetrafunctional epoxy/IL/hardener; "★": commercial epoxy-1/IL/salt; "□": commercial epoxy-2/IL/salt; "○": commercial epoxy-3/IL/salt; "■": BADGE/IL/plasticizer/salt/hardener/organoclay.

Figure 2:
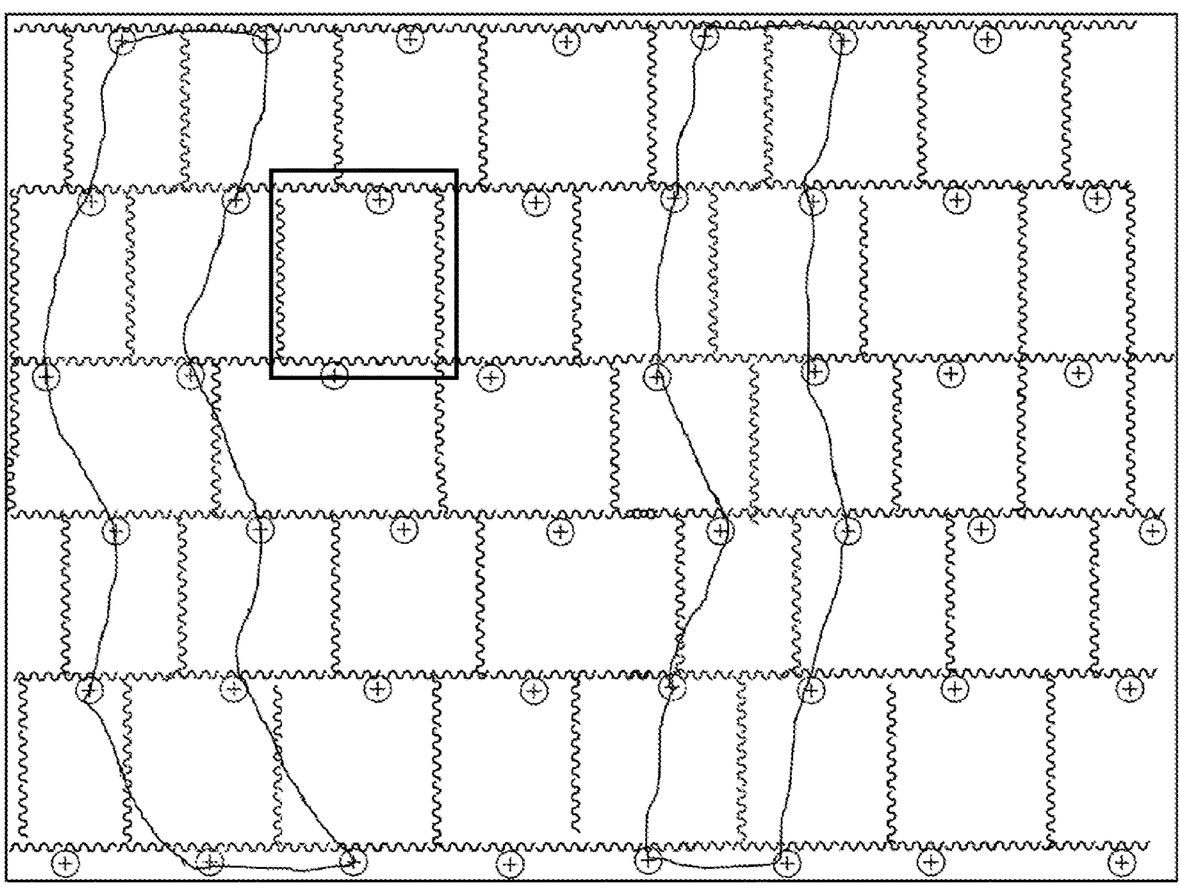

FIG. 2 shows the network formed by crosslinking the polymer-based electrolyte and the passageways of the cations in this network structure.

Figure 3:
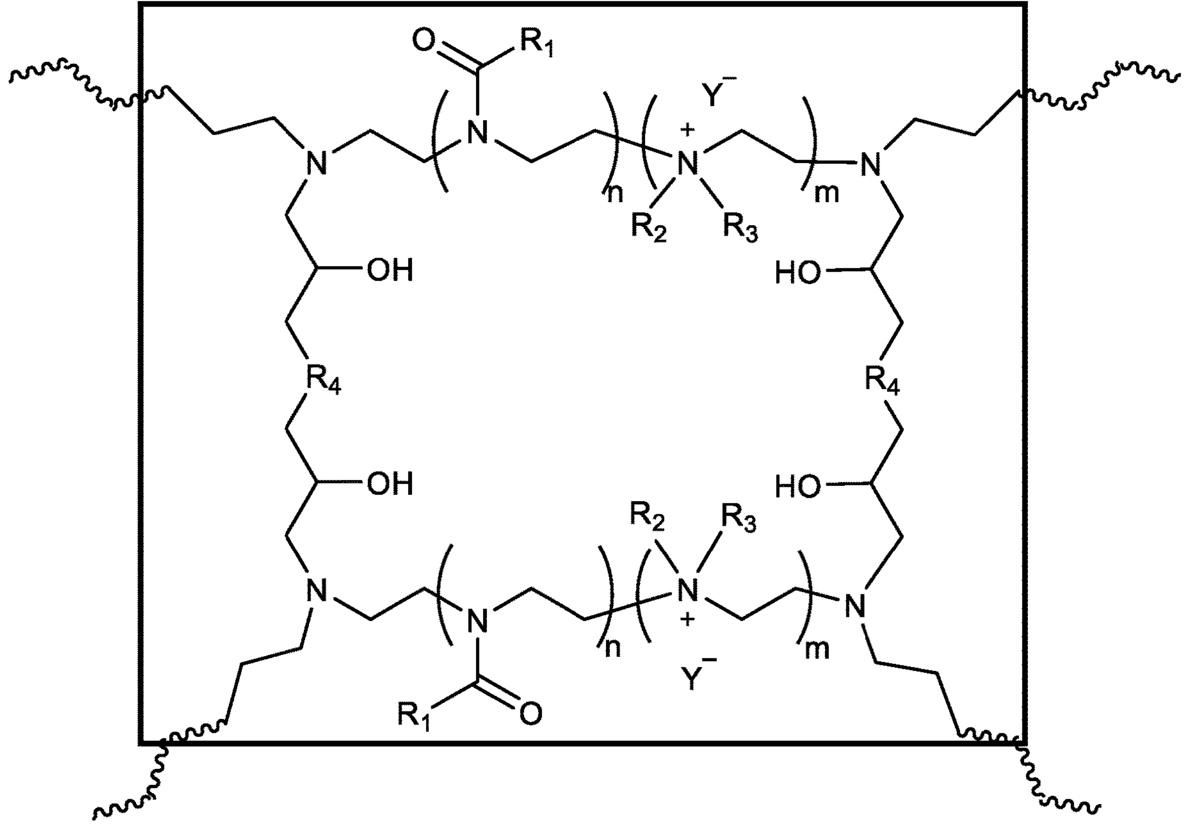

FIG. 3 shows the part of the network structure between the crosslinking points.

Figure 4:
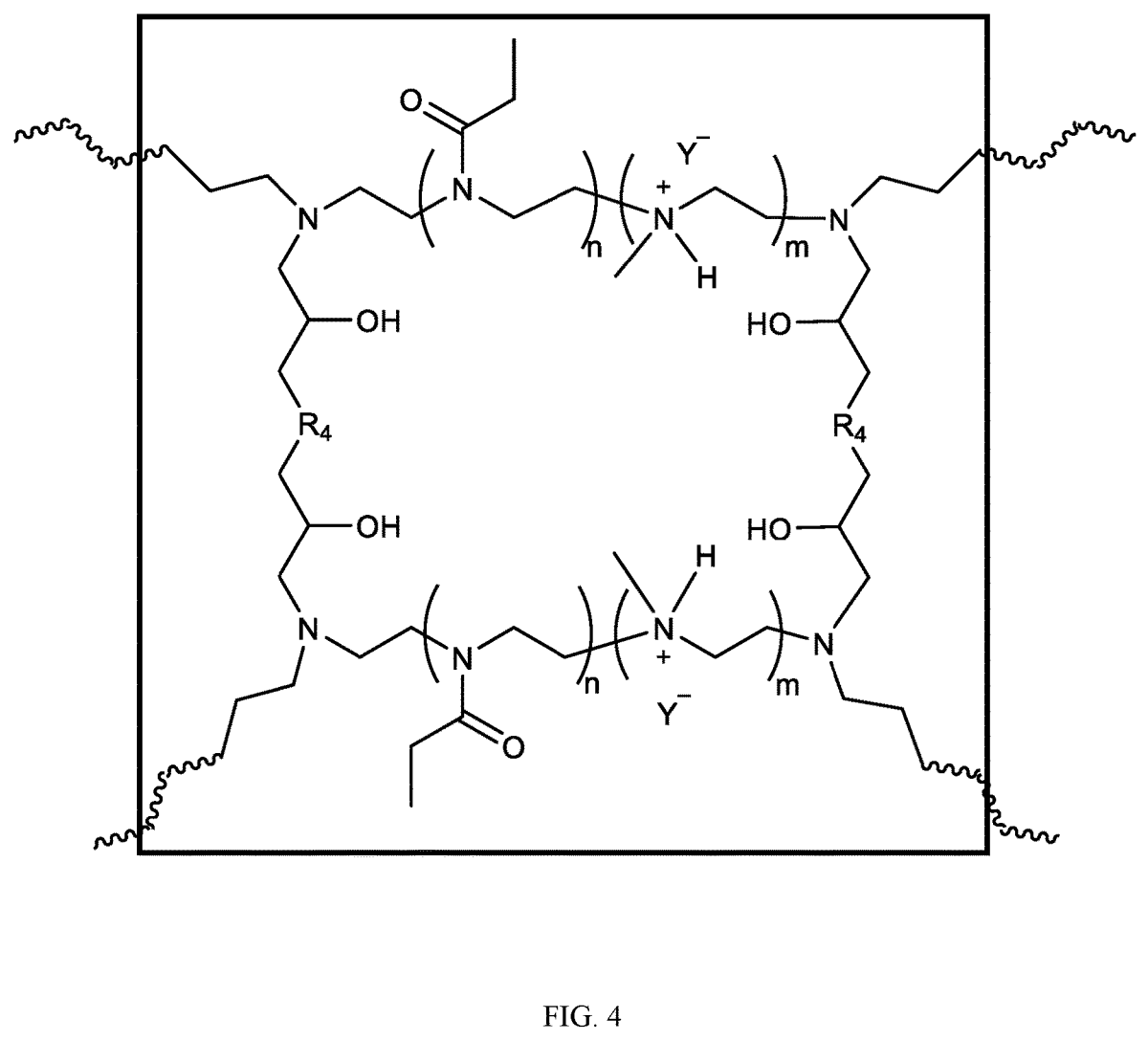

FIG. 4 shows an exemplary part of the network structure between the crosslinking points.

Figure 5:
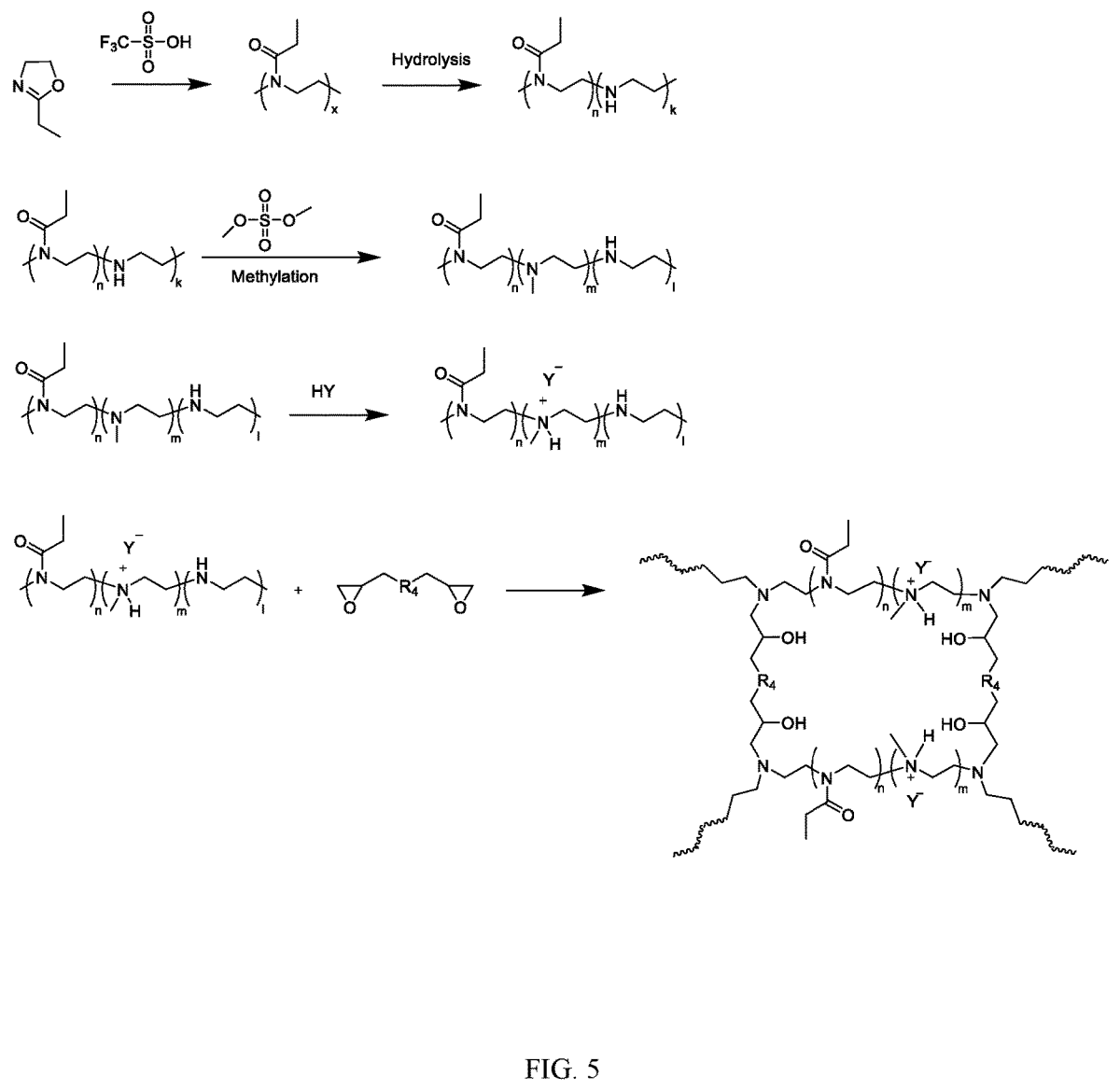

FIG. 5 shows the synthesis of an exemplary polyoxazoline polymer, an exemplary polyoxazoline-based electrolyte and an exemplary network structure formed from the said electrolyte (only the part of the network structure between crosslinking points is shown in detail).

DETAILED DESCRIPTION OF THE EMBODIMENTS

The present invention is described in detail below, with reference to the respective figures described above.

The present invention relates to a network formed by crosslinking of a polyoxazoline (POZ)-based electrolyte. The secondary amine groups present on the polymer backbone are allowed to react with an epoxy resin to obtain the network structure. Said secondary amine groups eliminate the need to use a separate curing agent for the constitution of the network structure.

The epoxy resin can be selected from the class having at least two epoxide groups, which will allow the formation of a crosslinked network structure. Various epoxy resins can be utilized for this purpose. For instance, diglycidyl ethers with different structures can be reacted with secondary amine groups of two adjacent POZ polymers to form a network structure. The size and structure of the epoxy resin selected determine the distance between two POZ polymers and the flexibility of the network structure. This will in turn determine both the distance between ionic groups present on different POZ polymers that will form the passageways for the migration of cations therethrough and thus the ionic conductivity. The general structure of the network illustrating the passageways throughout the network is provided in FIG. 2. The cross-section of the network between two crosslinking points along each POZ polymer backbone and two connection points of two adjacent POZ polymers is shown in FIG. 3. The distance between two crosslinking points is determined by the number of secondary amine groups present along the polymer backbone, which is determined by the composition of the polymer. The composition of the polymer is determined at the hydrolysis and methylation steps, where modifications can be precisely controlled. The distance between two connection points of two adjacent POZ polymers depends on the size of the epoxy resin, which is determined by the size of the $R_4$ group between two distal oxirane groups shown in FIG. 3. The distance between adjacent POZ polymers can be increased by selecting a "longer" $R_4$ group such as bisphenol-a over a "shorter" one such as ethylene glycol.

The present invention further proposes a polymer-based electrolyte that helps encapsulate anions ($Y^-$) and cations ($X^+$) in the network defined above. Said anions ($Y^-$) and cations ($X^+$) are introduced by use of an ionic component (e.g. one or more ionic solvents). The presence of such ionic component would help the migration of $Li^+$ ions through the passageways in the network. POZ-based polymer has secondary and tertiary amine groups that can be used in protonated or non-protonated forms. These groups are preferably protonated to a certain extent to obtain quaternary ammonium and secondary amine groups along the polymer backbone, thereby obtaining a polymer-based electrolyte that carries cationic groups and can also react to form a crosslinked network structure. After crosslinking the polymer-based electrolyte with epoxy resins, a network with dispersed quaternary ammonium groups that form the main structure of the passageways is obtained. The migration of $Li^+$ ions is accelerated by both the formation of passageways between the quaternary ammonium groups of the polymer in the network and the repulsive forces between said cations and quaternary ammonium groups.

Anions and cations can preferably be provided using one or more ionic solvents (abbreviated as XY) in said electrolyte. Since the positive charge in a quaternary ammonium cation is higher than the secondary or tertiary amine, the migration of lithium ions ($Li^+$) is accelerated in the presence of quaternary ammonium groups throughout the network. FIG. 3 shows the portion between two crosslinking points of the network structure formed as a result of the crosslinking of the secondary amine groups of polyoxazoline polymers carrying quaternary ammonium groups with epoxy resins. FIG. 4 shows a more specific example of the same network. Lithium salts are incorporated into the network during the crosslinking process either alone or in combination with ionic liquids (ILs) if necessary. The utilization of ionic liquids increases the mobility; thus, the ionic conductivity of the network. The ILs used herein are chosen in a way to obtain the same anion as $Y^-$ or a different anion, which will affect the dissociation capability of the ionic group present on the polymer backbone; therefore, the solubility of the lithium salts.

The present invention further proposes a method to obtain the network discussed above. The method includes the following consecutive steps.:

- iv. Cationic ring-opening polymerization of a monomer with a general formula of 2-R'-2-oxazoline to obtain a polymer with amide groups;
- v. Hydrolysis of the polymer (polymer chain) obtained in step (i) thereby obtaining a POZ chain containing secondary amines in addition to the amide groups mentioned in step (i);
- vi. Cross-linking of POZ chains through secondary amine groups, thereby obtaining a network of POZ backbones.

In step (ii), hydrolysis can be performed using any method known in the art, such as those involving the use of a strong acid or a strong base.

Preferably, the method includes the following step (x1) between the step (ii) and step (iii):

(x1) The partial conversion of secondary amine groups of the polymer obtained in step (ii) to quaternary ammonium groups by alkylation (e.g. methylation) and subsequent protonation, thereby obtaining polyoxazoline (POZ) chains carrying cationic groups.

Preferably, prior to the step (iii), the step (x1) is followed by the step (x2) as defined below:

(x2) Addition of cations ($X^+$) and anions ($Y^-$) to the POZ chains obtained in step (x1) thereby obtaining a mixture thereof. The introduction of these ions can be accomplished by using ionic solvents (e.g. $HPF_6$). This enables the early incorporation of the cations ($X^+$) and anions ($Y^-$) into the resulting network, thereby eliminating the need to develop a process to introduce these ions after the formation of the network. In addition to the polymeric ionic liquid groups present in the network, numerous ILs or solvents (e.g. ethylene carbonate, propylene carbonate) with various dissolved lithium salts can be included in the network during the crosslinking process to increase mobility and ionic conductivity.

The "$R_1$" group of the oxazoline monomer represents a linear, branched or cyclic aliphatic group or an aromatic group. The type of $R_1$ has an effect on the solubility of the monomer and mechanical properties of the formed network. A monomer with an aromatic $R_1$ group (such as 2-phenyl-2-oxazoline) results in a network with a higher rigidity and $T_g$ (glass transition temperature) and a lower ionic conductivity compared to a network created using a monomer with an aliphatic $R_1$ group (such as 2-ethyl-2-oxazoline). On the other hand, the use of an oxazoline monomer with a short alkyl chain, which is highly compatible with a wide variety of crosslinkers, leads to a flexible network structure with sufficient mechanical strength and high ionic conductivity.

Considering the $R_1$ group of the monomer, the aliphatic groups are more preferred among all groups listed above due to their commercial availability and ease and feasibility of their synthesis. Linear aliphatic groups can be selected from alkyl chains with a carbon number between 1 and 22, more preferably between 1 and 8, and even more preferably between 1 and 3, which are methyl-, ethyl-, and propyl-groups. Accordingly, the 2-$R_1$-2-oxazoline corresponds to a 2-alkyl-2-oxazoline selectable from 2-methyl-2-oxazoline, 2-ethyl-2-oxazoline, 2-propyl-2-oxazoline, or mixtures thereof. These monomers are highly preferable, since they are easy to synthesize and have low prices and high commercial availability. The extent of hydrophobicity of the monomers increases as the alkyl chain length increases. The compatibility of 2-ethyl-2-oxazoline is very good with both polar solvents (e.g. water) and non-polar solvents. Accordingly, 2-ethyl-2-oxazoline is particularly the most preferred monomer in the present invention.

FIG. 5 shows an exemplary version of the method according to the present invention, which includes the steps (i), (ii), (x1), (x2) and (iii) subsequently. In the example to the step (i) depicted in FIG. 5, triflic acid is used as an initiator and 2-ethyl-2-oxazoline is used as 2-alkyl-2-oxazoline monomer. Other known initiators can also be used instead of or along with triflic acid. In step (i), the cationic ring-opening polymerization is preferably progressed until the number (x) of repeating units reaches to a range between 2 and 1000, more preferably between 10 and 100, and even more preferably between 10 and 50.

In step (ii), the extent of hydrolysis can be preferably exercised such that the ratio of the number of amide groups (n) to the number of secondary amines (k) is arranged to be within the range between 100:1 and 1:100, more preferably 9:1 and 1:9. This measure can be applied without undue burden by a person skilled in polymer synthesis. Increasing the (n)/(k) ratio corresponds to:

- Decreased number of cross-linkable secondary amines along the POZ backbone, resulting in a decreased rigidity in the network;
- increased distance between crosslinking points along POZ backbone, which facilitates the flexibility of the network upon crosslinking; therefore, increasing the likelihood of the movement of cations through the passageways across the formed network and the conductivity of the network;
- decreased occurrence of secondary or tertiary amine groups as obtained in the step (x1), which will affect the number of crosslinking sites as well as the number of cationic groups present on the polyoxazoline-based electrolyte and the resulting network.

In step (ii), a portion of amide groups on the polymer chains are hydrolyzed to form secondary amine groups. The molar ratio of amide groups to secondary amines (i.e. the n/k ratio as discussed above) can be arranged via controlling the extent of hydrolysis, by a person skilled in organic chemistry, without undue burden. A pre-determined portion of secondary amines in the resulting polymer can be methylated. This can be followed by quaternization in step (x1) with the use of ionic solvent (XY) to obtain quaternary ammonium groups on the POZ backbone that will act as polymer-bound ionic components. These ionic components will provide a medium for lithium salts to dissolve. The presence of the ionic components on the polymer will also make it possible not to include additional ionic liquids and/or other solvents in the network or include them at lower quantities in case they are included. The negative effect of the inclusion of such molecules (ionic liquids and/or other solvents) in the network on the mechanical properties will therefore be limited by this way. These ionic components will also create an ionic passageway for lithium ions to move throughout the network, which is shown in FIG. 2.

The ionic conductivity of electrolyte can be improved by proper selection of ionic components (XY). The anions ($Y^-$) with highly delocalized negative charges would promote the solvation of $Li^+$ ions in the network by facilitating the movement of the $Li^+$ ions through passageways along the network, thereby increasing the conductivity of the respective polymer-based electrolyte. Selection of lithium salts can be made taking dissociation constants (Kd) and/or volumetric bulkiness degrees of respective anions. Since $Y^-$ anions are not bonded covalently to the network, they will move inside the network as well. However, by selecting a relatively bigger anion, the movement of anions would be rather limited. Although the relatively bigger anions also contribute to the ionic conductivity, the movement of such anions will also lead to the polarization, which decreases the life time of the electrolyte. If $Li^+$ cations are the only components which contribute to ionic conduction, it can be considered as a single-ion conducting solid electrolyte.

Increasing $K_d$ values (well delocalized electrical charges along with low basicity) inherently corresponds to increasing differences between volumetric bulkiness degrees of respective anions ($Y^-$) and $Li^+$ cations in a respective lithium salt structure and are therefore preferable. When comparing various lithium salts (i.e. $LiPF_6$, $LiClO_4$, LiBF4, LiTFSI, LiTf, LiFSI), larger bulkiness of anions promotes the dissociation of $Li^+$ ions and facilitates the travel thereof through passageways along the network, thereby increasing the conductivity of a respective polymer-based electrolyte.

Considering the above-discussed main effects of the (n)/(k) ratio, said ratio being within the range between 9:1 and 1:9 ensures a high extent of rigidity along with a sufficient extent of ionic conductivity. More preferably, said ratio of (n)/(k) is within the range between 3:1 and 1:3. This range corresponds to a sweet spot that simultaneously enables acceptable degrees of rigidity and conductivity.

In step (iii), the cross-linking of POZ chains takes place via the reaction of secondary amine groups of the polymers with epoxy resins to form a mechanically and ionic conductively high-performing interconnected polymeric network. The presence of secondary amines on the POZ backbone eliminates the necessity to use any additional curing agents. Chemical structures of $R_1$ and $R_4$ groups determine the final mechanical properties, viscosity, crystallinity and cation mobility.

Figure 1:
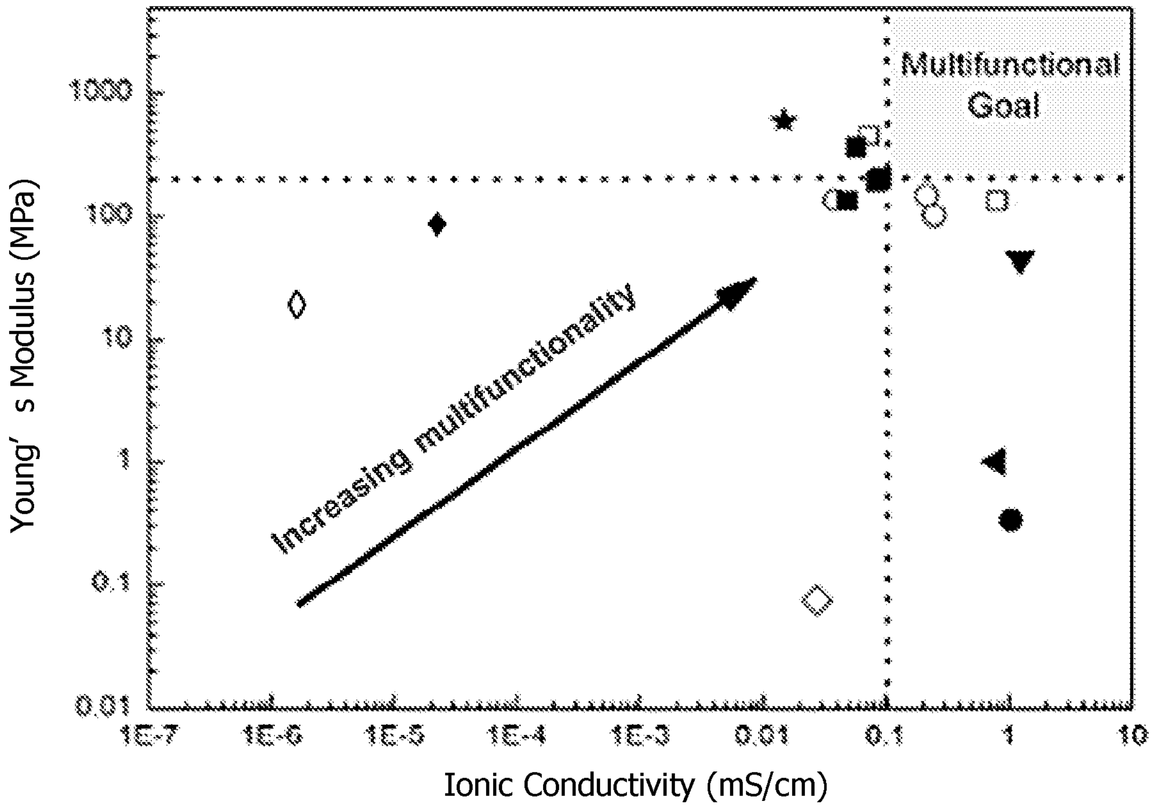
FIG. 1 is a diagram showing the multifunctionality degree of various systems investigated in prior publications (Yu, Y., Zhang, B., Wang, Y., Qi, G., Tian, F., Yang, J., Wang, S. 2016. "Co-continuous structural electrolytes based on ionic liquid, epoxy resin and organoclay: Effects of organoclay content", Materials and Design, 104, 126-133, DOI: 10.1016/j.matdes.2016.05.004). The symbols used in the figure represent the following systems.

Polyoxazoline (POZ) as backbone attains a mechanically strong and ionically conductive polymer. POZ is considered as a suitable and even advantageous alternative to poly (ethylene oxide) (PEO/PEG) polymers, which are widely used as solid electrolytes for energy storage devices. The multifunctional network of POZ makes it possible to link several chemical groups to a single polymer backbone, which improves the multifunctionality of the structure. For the first time in the literature, ionically conductive POZ-based polymer will be utilized as a "multifunctional electrolyte" through integration of the ionic component(s) to the backbone of POZ polymer. The confinement of ionic component(s) to the POZ backbone enables us to 1) control the pathway of ions in molecular scales and increase the lithium ion transference number and 2) eliminate the two-phase problem in structural electrolytes. The multifunctional nature of POZ along with other features used in formation of the polymer-based electrolyte, provides a highly ion conductive network with adequate mechanical performance, i.e. both conductivity and Young's modulus values fall within the targeted multifunctionality region shown in FIG. 1. To provide stiffness, various cross-linking agents such as various diglycidyl ethers could be attached to the backbone of POZ. It is also possible to replace various multifunctional polymers with POZ using the formulation and methodology mentioned here.

An inorganic nanofiller e.g. silica ($SiO_2$), titanium dioxide ($TiO_2$), or halloysite nanotube (HNT) can be employed to increase the extent of amorphousness of the network, to even further improve ionic transportation ability inside the polymer-based electrolyte.

As a way to determine a geometric shape/contour of the network, prior to cross-linking, POZ can be casted using thin separators made of robust (e.g. self-supporting) polymeric films and veils to prepare an ionically conductive prepreg. This exemplary way is applicable in preparation of various types of multifunctional energy storage devices such as wearable/flexible supercapacitors, structural supercapacitors and lithium-ion batteries, with the network according to the present application.

Hence, the present invention renders at least the following advantages available:

As mentioned in the Background section, currently used electrolyte systems deteriorate the mechanical performance of the final composite product since there is a trade-off between ionic conductivity and mechanical performance. The present invention proposes a polymeric network by precise engineering of functional groups, molecular weight, and morphology of synthesized polymer, which leads to enhanced electrolyte properties without drastically degrading mechanical performance of final composite product in comparison to neat resin system.

Polyoxazoline (POZ) is used as an advantageous alternative to known polymeric electrolytes. The multifunctional network of POZ provides ease in the design and formulation of polymer-based electrolytes with desired characteristics. The ability to attach a great variety of cross-linkers (e.g. various diglycidyl ethers such as ethylene glycol diglycidyl ether, resorcinol diglycidyl ether, bisphenol A diglycidyl ether) enables an easy tailoring of stiffness and ionic conductivity.

Secondary amine groups in the POZ acts as curing agent, eliminating the need to include additional curing agents during the formation of the network.

In background art, since the combination of IL with PEG accelerates the curing time of polymer, it leads to a reduced processability. In contrast to PEG, POZ has lower viscosity, which helps the processibility, while the lack or minimal use of ILs and solvents during the network formation process lowers the possibility of having any problems related to the processability such as the acceleration of curing.

Multifunctional network of POZ enables an enhanced control on various parameters such as molecular weight, chain length, distance between consecutive functional groups, and crosslinking density; resulting in the formation of a homogeneous and interconnected network with improved ion transport and mechanical performance.

The proposed POZ-based electrolyte can be integrated to various structural energy storage systems such as structural supercapacitors, structural lithium-ion batteries, flexible electronics, wearable electronics, etc.

The present invention is expected to open up new opportunities specially in the field of multifunctional polymeric composites and makes it possible to expand technology readiness level (TRL) of structural energy storage devices.

The following example is based on a proof-of-concept experiment within the context of the present application. Depicted or mentioned specific features such as chain lengths and functional groups are to be considered as mere examples to possible variations thereof, within the scope of the independent claims.

EXAMPLE

An experimental work is performed to prove that the proposed technology establishes an alternative to conventional multifunctional electrolyte systems. An exemplary route in obtainment of a polymer-based electrolyte is shown in FIG. 5. FIG. 5 shows the synthesis of an exemplary POZ-based polymer, an exemplary polymer-based electrolyte, and an exemplary network. The steps shown in FIG. 5 refer to examples to the steps of: (i) ring opening polymerization of 2-ethyl-2-oxazoline in the presence of triflic acid as initiator with different molecular weights ($M_W$) of 1 kDa, 2 kDa, and 5 kDa have been tried and it is witnessed that each of these options perfectly work, (ii) hydrolysis of synthesized polymer to form secondary amine groups, (x1) methylation and (x2) introduction of ionic component, (iii) reaction of the secondary amine groups of POZ polymer with different epoxy resins to form the network structure.

In the present exemplary experiment, POZ is synthesized via ring opening polymerization of 2-ethyl-2-oxazoline as monomer and triflic acid as initiator (FIG. 5, step (i)). Different types of monomers such as 2-methyl-2-oxazoline and 2-propyl-2-oxazoline can also be used in the synthesis of POZ polymer. A typical procedure for the ring-opening polymerization of poly(2-oxazoline) is employed, which is described by Viegas et al. (Bioconjugate Chem. 2011, 22, 5, 976-986, DOI: 10.1021/bc200049d).

For the ring-opening polymerization (step (i)), first, a mixture including a monomer and initiator is prepared. The molecular weight (MW) of the resulting polymeric chain can be easily pre-determined by adjusting the ratio of the molar amounts of the monomer ($M_0$) and initiator ($I_0$) in the initial mixture. A broad range of molecular weights can be synthesized by varying the process parameters, as deducible to a person skilled in organic synthesis, using prior art knowledge. The mixture is heated in a reactor, e.g. to a temperature within the range between 60° C. and 90° C., depending on desired MW. To terminate the polymerization, contents of the reactor is cooled down and mixed with a terminating agent containing a group terminus, e.g. hydroxyl or carboxylic acid.

The quaternary ammonium groups can be considered as sites to provide an ionic liquid character to the electrolyte according to the present invention.

REFERENCE SIGNS

R1 in an oxazoline monomer, a side group connected to the oxazoline ring

R2 in a POZ chain, hydrogen atom, methyl or another alkyl group

R3 Hydrogen atom

R4 portion of an epoxy resin connecting two distal ends (diglycidyl ethers)

$X^+$ cation of the ionic component present on the POZ backbone $Y^-$ anion of the ionic component present on the POZ backbone k the total of 1 and m (the number of repeating units with secondary amine groups after the hydrolysis step)

l number of repeating units of POZ with secondary amine groups m number of repeating units of POZ with quaternary ammonium groups x number of repeating units of the POZ polymer

What is claimed is:

1. A method for obtaining a network with dispersed quaternary ammonium groups, comprising the following subsequent steps:

iii. a cationic ring-opening polymerization of a monomer with a general formula of 2-$R_1$-2-oxazoline to obtain a polyoxazoline polymer with amide groups, wherein the $R_1$ in the monomer is selected from the group consisting of linear aliphatic groups, branched aliphatic groups, cyclic aliphatic groups, and aromatic groups;

iv. a hydrolysis of the polyoxazoline polymer obtained in step (i) to obtain, a first POZ chains comprising secondary amine groups in addition to the amide groups mentioned in step (i);

x1. a partial conversion of the secondary amine groups to tertiary amine groups to obtain second POZ chains with tertiary amine groups;

x2. a protonation of the tertiary amine groups with one or more ionic components (XY) to introduce quaternary ammonium groups with corresponding anions (Y-) to constitute a polyoxazoline-based electrolyte comprising the quaternary ammonium groups and the secondary amine groups as crosslinking sites for a formation of the network;

iii. a crosslinking of the first POZ chains with an epoxy resin via the secondary amine groups of the first POZ chains to obtain the network.

2. The method according to claim 1, wherein the step x2 is followed by an introduction of one or more ionic liquids (ILs) and/or one or more organic solvents with one or more lithium salts dissolved therein.

3. The method according to claim 1, wherein the $R_1$ in the monomer is selected from the group consisting of methyl, ethyl, and propyl; the monomer comprises 2-methyl-2-oxazoline, 2-ethyl-2-oxazoline, 2-propyl-2-oxazoline, or a mixture thereof.

4. The method according to claim 3, wherein the monomer is the 2-ethyl-2-oxazoline.

5. The method according to claim 3, wherein the crosslinking in step (iii) comprises a use of a diglycidyl ether as a cross-linking agent.

6. The method according to claim 5, wherein the crosslinking agent is at least one selected from the group consisting of an ethylene glycol diglycidyl ether, a resorcinol diglycidyl ether, and a bisphenol-A diglycidyl ether.

7. The method according to claim 1, wherein in step (i), the cationic ring-opening polymerization is progressed until a chain comprises a number (x) of repeating units of the polyoxazoline polymer, the number (x) being within a range between 2 and 1000.

8. The method according to claim 1, wherein in step (ii), an extent of the hydrolysis is exercised such that a ratio of a number of the amide groups (n) to a number of secondary amines (k) is arranged to be within a range between 100:1 and 1:100.

9. The method according to claim 7, wherein the number (x) is within the range between 10 and 100.

10. The method according to claim 7, wherein the number (x) is within the range between 10 and 50.

11. The method according to claim 8, wherein the range is between 9:1 and 1:9.

12. The method according to claim 2, wherein the $R_1$ in the monomer is selected from the group consisting of linear aliphatic groups, branched aliphatic groups, cyclic aliphatic groups, and aromatic groups.

13. The method according to claim 2, wherein the cross-linking in step (iii) comprises a use of a diglycidyl ether as a cross-linking agent.

14. The method according to claim 1, wherein the cross-linking in step (iii) comprises a use of a diglycidyl ether as a cross-linking agent.

15. The method according to claim 3, wherein the cross-linking in step (iii) comprises a use of a diglycidyl ether as a cross-linking agent.

16. The method according to claim 4, wherein the cross-linking in step (iii) comprises a use of a diglycidyl ether as a cross-linking agent.

17. The method according to claim 2, wherein in step (i), the cationic ring-opening polymerization is progressed until a chain comprises a number (x) of repeating units of the polyoxazoline polymer, the number (x) being within a range between 2 and 1000.

* * * * *